US012614853B1

(12) United States Patent
Curry

(10) Patent No.: US 12,614,853 B1
(45) Date of Patent: Apr. 28, 2026

(54) BROADBAND LOW FREQUENCY PASSIVE RECEIVING ANTENNA SYSTEM

(71) Applicant: David Foster Curry, Burbank, CA (US)

(72) Inventor: David Foster Curry, Burbank, CA (US)

( * ) Notice: Subject to any disclaimer, the term of this patent is extended or adjusted under 35 U.S.C. 154(b) by 0 days.

(21) Appl. No.: 19/083,020

(22) Filed: Mar. 18, 2025

Related U.S. Application Data

(60) Provisional application No. 63/550,671, filed on Feb. 7, 2024.

(51) Int. Cl.
| | |
|---|---|
| *H01Q 1/10* | (2006.01) |
| *H01Q 9/00* | (2006.01) |
| *H01Q 9/34* | (2006.01) |
| *H04B 1/16* | (2006.01) |

(52) U.S. Cl.
CPC ................. *H01Q 9/34* (2013.01); *H01Q 1/10* (2013.01); *H04B 1/16* (2013.01)

(58) Field of Classification Search
CPC .. H01Q 1/10; H01Q 1/32; H01Q 1/50; H01Q 9/00; H01Q 9/34; H04B 1/16
See application file for complete search history.

(56) References Cited

U.S. PATENT DOCUMENTS

| | | | | | |
|---|---|---|---|---|---|
| 4,028,704 | A | * | 6/1977 | Blass ....................... | H01Q 9/30 343/900 |
| 4,095,229 | A | * | 6/1978 | Elliott .................... | H01Q 5/321 455/142 |
| 4,141,016 | A | * | 2/1979 | Nelson .................... | H03H 7/38 343/858 |
| 4,536,768 | A | * | 8/1985 | Dubowicz .............. | H01Q 11/06 343/739 |
| 4,647,941 | A | * | 3/1987 | Myer ....................... | H01Q 1/10 343/903 |
| 4,958,164 | A | * | 9/1990 | Lewis, Jr. ................ | H01Q 9/32 343/722 |
| 5,751,253 | A | * | 5/1998 | Wells ................... | H01Q 1/1285 343/745 |
| 7,839,344 | B2 | * | 11/2010 | Marrocco .............. | H01Q 5/321 343/709 |

* cited by examiner

*Primary Examiner* — Tho G Phan

(74) *Attorney, Agent, or Firm* — Plager Schack LLP; Mark H. Plager; Stephen Hallberg

(57) ABSTRACT

A broadband low frequency passive receiving antenna system is disclosed which is an omnidirectional receiving antenna configured to provide broadband reception of the low frequency (LF) portion of the radio frequency (RF) spectrum. The broadband low frequency passive receiving antenna system "floats" in the radiated noise field. The broadband low frequency passive receiving antenna system has a differential input so it cancels the common mode noise which surrounds it.

10 Claims, 3 Drawing Sheets

200

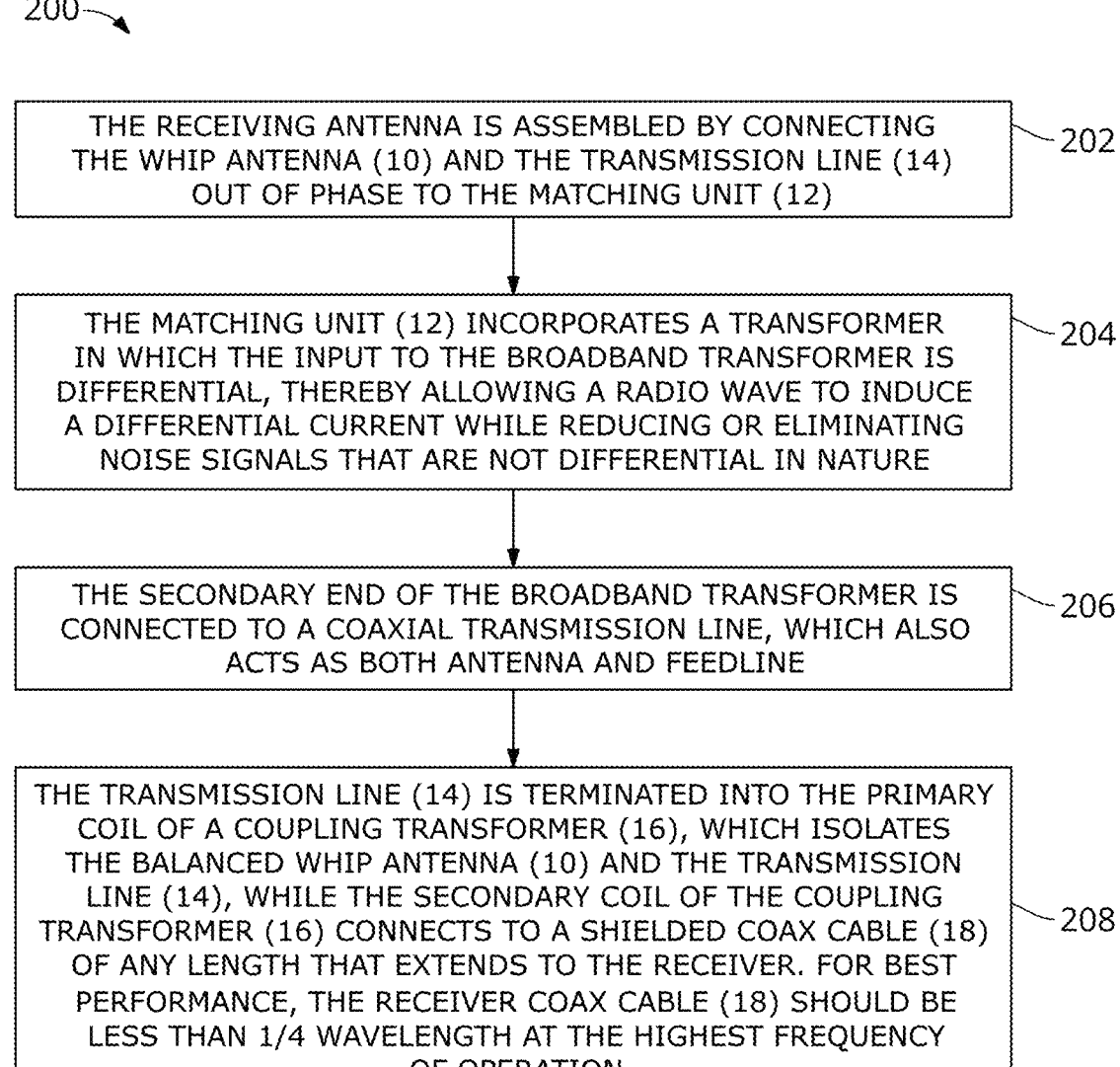

THE RECEIVING ANTENNA IS ASSEMBLED BY CONNECTING THE WHIP ANTENNA (10) AND THE TRANSMISSION LINE (14) OUT OF PHASE TO THE MATCHING UNIT (12) ～202

THE MATCHING UNIT (12) INCORPORATES A TRANSFORMER IN WHICH THE INPUT TO THE BROADBAND TRANSFORMER IS DIFFERENTIAL, THEREBY ALLOWING A RADIO WAVE TO INDUCE A DIFFERENTIAL CURRENT WHILE REDUCING OR ELIMINATING NOISE SIGNALS THAT ARE NOT DIFFERENTIAL IN NATURE ～204

THE SECONDARY END OF THE BROADBAND TRANSFORMER IS CONNECTED TO A COAXIAL TRANSMISSION LINE, WHICH ALSO ACTS AS BOTH ANTENNA AND FEEDLINE ～206

THE TRANSMISSION LINE (14) IS TERMINATED INTO THE PRIMARY COIL OF A COUPLING TRANSFORMER (16), WHICH ISOLATES THE BALANCED WHIP ANTENNA (10) AND THE TRANSMISSION LINE (14), WHILE THE SECONDARY COIL OF THE COUPLING TRANSFORMER (16) CONNECTS TO A SHIELDED COAX CABLE (18) OF ANY LENGTH THAT EXTENDS TO THE RECEIVER. FOR BEST PERFORMANCE, THE RECEIVER COAX CABLE (18) SHOULD BE LESS THAN 1/4 WAVELENGTH AT THE HIGHEST FREQUENCY OF OPERATION ～208

FIG. 2

BROADBAND LOW FREQUENCY PASSIVE RECEIVING ANTENNA SYSTEM

CLAIM OF BENEFIT TO PRIOR APPLICATION

This application claims benefit to U.S. Provisional Patent Application 63/550,671, entitled "BROADBAND LOW FREQUENCY PASSIVE RECEIVING ANTENNA SYSTEM," filed Feb. 7, 2024. The U.S. Provisional Patent Application 63/550,671 is incorporated herein by reference.

BACKGROUND

Embodiments of the invention described in this specification relate generally to antennas and antenna systems, and more particularly, to a broadband low frequency passive receiving antenna system.

Receiving antennas that are broadband and cover the Low Frequency (LF) portion of the radio spectrum are often inconvenient because they require both (i) a power supply to provide power to operate the remote antenna pre-amplifier, and (ii) a "T" coupler that couples the receiver, antenna, and power source at the receiving location. If used in conjunction with a transmitter for two-way communication, the strong radio frequency (RF) field of the nearby transmitter can damage the pre-amplifier from overload. Therefore, the pre-amplifier must be in either the "off" state or "standby" state during transmission. Local AM broadcast stations also cause severe overload to the pre-amplifier, causing inter-modulation distortion (IMD) within the receiver passband due to their proximity and high power.

Furthermore, passive antennas in the LF portion of the radio spectrum are usually large or long due to its long wavelengths. Most casual users will simply string a wire out the window as long as possible to receive signals. However, this may be in relatively close proximity to power lines and other man-made noise sources which, as a consequence, means that considerable noise is also received. Loop antennas (passive or active) are helpful in these circumstances because they can be rotated to Null the noise source, but often pickup magnetic-coupled noise from nearby sources and are typically required to be located as far as possible from buildings.

Additionally, passive LF antennas have a resonance or peaked response on a desired frequency and require re-tuning of the antenna to change frequencies. The bandwidth caused by this peaking is very narrow and smears noise pulses. Noise pulses are often very short but stretching the noise pulse can cause difficulty for noise blanker and digital processing to differentiate between the noise and desired signal.

Most LF broadband antennas fail in urban/suburban areas because they are unbalanced which causes noise from the ground path at the receiver and/or earth ground to be injected at the connection point of the antenna back into the receiving path.

Therefore, what is needed is a passive antenna (requiring no power) that is a relatively small size, lowers background noise of low frequency reception, is insensitive to overload, and is not resonate and does not stretch or disturb the noise pulse, thus allowing the noise blanker or processing of a modern receiver to effectively remove, nullify, or otherwise "Blank" the noise pulse.

BRIEF DESCRIPTION

A novel broadband low frequency passive receiving antenna system is disclosed. In some embodiments, the broadband low frequency passive receiving antenna system "floats" in the radiated noise field. In some embodiments, the broadband low frequency passive receiving antenna system has a differential input so it cancels the common mode noise which surrounds it. In some embodiments, the broadband low frequency passive receiving antenna system requires a fifty Ohm ("50-Ohm") input on the receiver and uses a 50-Ohm coax between the receiver and coupler feed point, such as RG-58. In this way, the broadband low frequency passive receiving antenna system is able to provide lower noise pickup than traditional antennas because it differentiates between noise and the desired signal. The input is balanced and noise, which is common to both sides of the antenna, is reduced or even canceled. Additionally, reduction in strong AM station interference occurs by use of the broadband low frequency passive receiving antenna system. In particular, the broadband low frequency passive receiving antenna system has reduced sensitivity in the AM broadcast band which helps to minimize receiver overload.

In some embodiments, the broadband low frequency passive receiving antenna system is an omnidirectional receiving antenna configured to provide broadband reception of the LF portion of the RF spectrum. In some embodiments, the broadband low frequency passive receiving antenna system comprises an antenna, a matching unit (also referred to as the "matching network"), a transmission line, a coupling transformer (also referred to as the "coupler"), and a radio transmission line that connects to a radio. In some embodiments, the broadband low frequency passive receiving antenna system further comprises a mast. In some embodiments, the antenna, the matching unit, the transmission line, and the coupling transformer work together to provide reception of radio signals in the 10 kHz-800 kHz range, which are transmitted to the radio over the radio transmission line.

In some embodiments, the antenna comprises a vertical antenna. In some embodiments, the vertical antenna comprises a short user-defined vertical antenna. In some embodiments, the broadband low frequency passive receiving antenna system incorporates the vertical antenna by connection to the matching unit. In some embodiments, the vertical antenna comprises a citizens band (CB) whip antenna. In some embodiments, the vertical antenna comprises a telescopic mast antenna. In some embodiments, the vertical antenna comprises a wire antenna.

In some embodiments, the broadband low frequency passive receiving antenna system is installed at a location above a roof-line of a structure and away from power lines. In some embodiments, the broadband low frequency passive receiving antenna system can be deployed in portable or field operations by hanging from a tree branch or other tall natural structure. In some embodiments, the vertical antenna can be any size. In a preferred embodiments, the size of the vertical antenna is a length from nine feet to thirty feet long. The preferred size/length of the vertical antenna element is widely available in the market (considered an off-the-shelf product), making it convenient for the user.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed.

Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 2 conceptually illustrates a flow chart of operations and relationships of the components of the broadband low frequency passive receiving antenna system in some embodiments.

DETAILED DESCRIPTION

Figure 1:
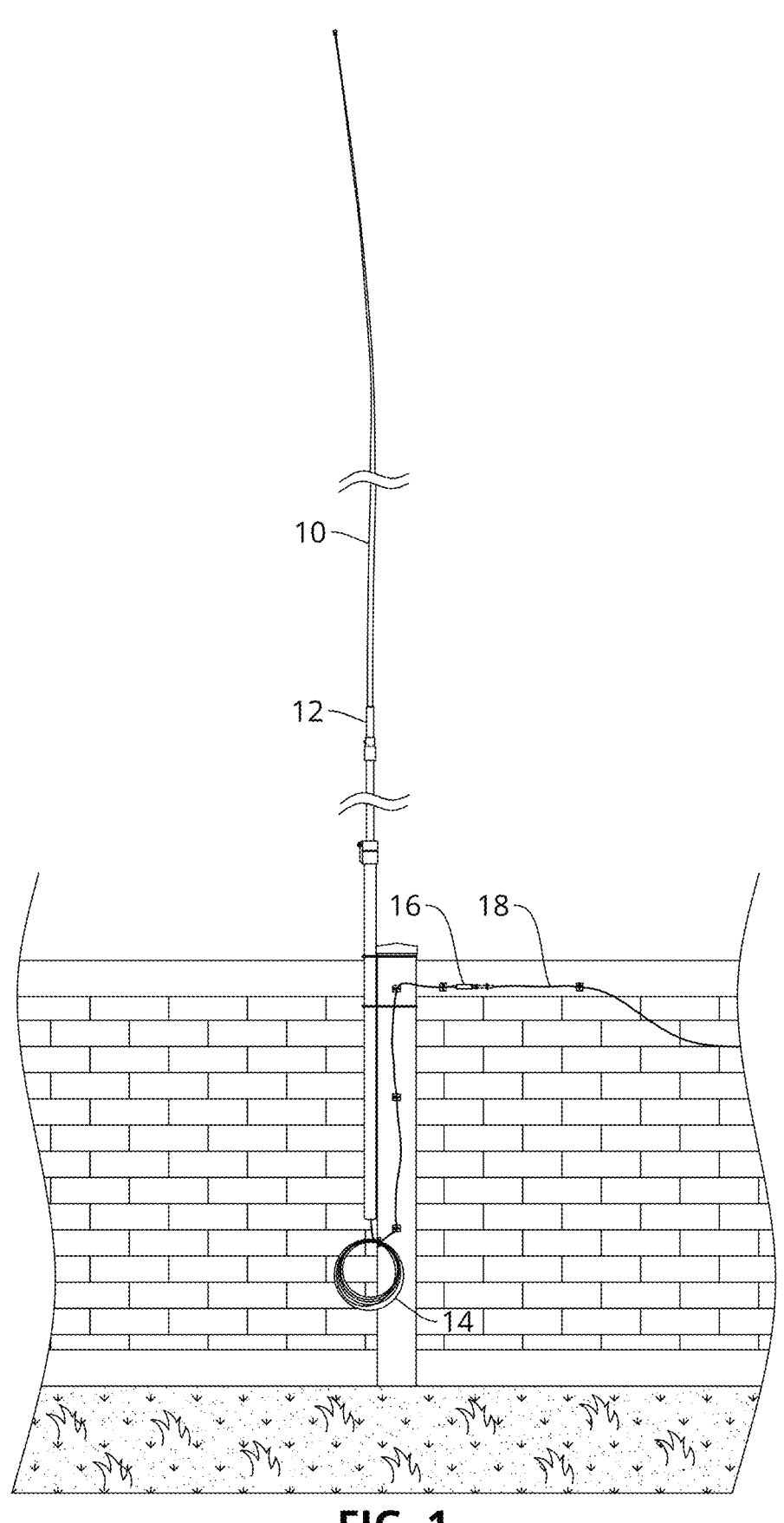
FIG. 1 conceptually illustrates a front view of an exemplary installation of a broadband low frequency passive receiving antenna system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Embodiments of the invention described in this specification include a novel broadband low frequency passive receiving antenna system-which is an omnidirectional receiving antenna configured to provide broadband reception of the low frequency (LF) portion of the radio frequency (RF) spectrum. In some embodiments, the broadband low frequency passive receiving antenna system "floats" in the radiated noise field. In some embodiments, the broadband low frequency passive receiving antenna system has a differential input so it cancels the common mode noise which surrounds it. In some embodiments, the broadband low frequency passive receiving antenna system requires a 50-Ohm input on the receiver and uses 50-Ohm coax between the receiver and coupler feed point, such as RG-58. In this way, the broadband low frequency passive receiving antenna system is able to provide lower noise pickup than traditional antennas because it differentiates between noise and the desired signal. The input is balanced and noise, which is common to both sides of the antenna, is reduced or even canceled. Additionally, reduction in strong AM station interference occurs by use of the broadband low frequency passive receiving antenna system. In particular, the broadband low frequency passive receiving antenna system has reduced sensitivity in the AM broadcast band which helps to minimize receiver overload.

In some embodiments, the broadband low frequency passive receiving antenna system omnidirectional. As an omnidirectional receiving antenna, the broadband low frequency passive receiving antenna system is configured to receive broadband signals that are broadcast within the LF portion of the RF spectrum. In some embodiments, the broadband low frequency passive receiving antenna system comprises an antenna, a matching unit (also referred to as the "matching network"), a transmission line, a coupling transformer (also referred to as the "coupler"), and a radio transmission line that connects to a radio. In some embodiments, the broadband low frequency passive receiving antenna system further comprises a mast. In some embodiments, the antenna, the matching unit, the transmission line, and the coupling transformer work together to provide reception of radio signals in the 10 kHz-800 kHz range, which are transmitted to the radio over the radio transmission line.

In some embodiments, the antenna comprises a vertical antenna. In some embodiments, the vertical antenna comprises a short user-defined vertical antenna. In some embodiments, the broadband low frequency passive receiving antenna system incorporates the vertical antenna by connection to the matching unit. In some embodiments, the vertical antenna comprises a citizens band (CB) whip antenna. In some embodiments, the vertical antenna comprises a telescopic mast antenna. In some embodiments, the vertical antenna comprises a wire antenna.

In some embodiments, the broadband low frequency passive receiving antenna system is installed at a location above a roof-line of a structure and away from power lines. In some embodiments, the broadband low frequency passive receiving antenna system can be deployed in portable or field operations by hanging from a tree branch or other tall natural structure. In some embodiments, the vertical antenna can be any size. In a preferred embodiments, the size of the vertical antenna is a length from nine feet to thirty feet long. The preferred size/length of the vertical antenna element is widely available in the market (considered an off-the-shelf product), making it convenient for the user.

As stated above, receiving antennas that are broadband and cover the LF portion of the radio spectrum are often inconvenient because they require both (i) a power supply to provide power to operate the remote antenna pre-amplifier, and (ii) a "T" coupler that couples the receiver, antenna, and power source at the receiving location. If used in conjunction with a transmitter for two-way communication, the strong RF field of the nearby transmitter can damage the pre-amplifier from overload. Therefore, the pre-amplifier must be in either the "off" state or "standby" state during transmission. Local AM broadcast stations also cause severe overload to the pre-amplifier, causing IMD within the receiver passband due to their proximity and high power. Furthermore, passive antennas in the LF portion of the radio spectrum are usually large or long due to its long wavelengths. Most casual users will simply string a wire out the window as long as possible to receive signals. However, this may be in relatively close proximity to power lines and other man-made noise sources which, as a consequence, means that considerable noise is also received. Loop antennas (passive or active) are helpful in these circumstances because they can be rotated to Null the noise source, but often pickup magnetic-coupled noise from nearby sources and are typically required to be located as far as possible from buildings. Additionally, passive LF antennas have a resonance or peaked response on a desired frequency and require re-tuning of the antenna to change frequencies. The bandwidth caused by this peaking is very narrow and smears noise pulses. Noise pulses are often very short but stretching the noise pulse can cause difficulty for noise blanker and digital processing to differentiate between the noise and desired signal. Most LF broadband antennas fail in urban/suburban areas because they are unbalanced which causes noise from the ground path at the receiver and/or earth ground to be injected at the connection point of the antenna back into the receiving path. Embodiments of the broadband low frequency passive receiving antenna system described in this specification solve these problems without requiring power, in a small form factor size (relative to other antennas), and by providing a large bandwidth such that this LF broadband antenna can be located away from noise sources and not affected by AM broadcast band interference due to signal overload.

Embodiments of the broadband low frequency passive receiving antenna system described in this specification differ from and improve upon currently existing options. In particular, the broadband low frequency passive receiving antenna system has better immunity to noise by canceling a portion of the noise it receives. Man-made noise is predominately a field that couples to an antenna by close proximity to power lines and the associated wiring in buildings, etc. In particular, the broadband low frequency passive receiving antenna system of the present specification differentiates between a radio wave and a noise field while regular E-field antennas do not.

Noise common to power lines and man-made devices such as switching power supplies and "efficiency" lighting will be present on the ground and neural lines. This, in turn, is now present on a receiver which draws its power from these sources and conducts via the antenna coax connection to the antenna where it is fed into the receiver input. The broadband low frequency passive receiving antenna system "floats" in the radiated noise field. The broadband low frequency passive receiving antenna system also has a differential input so it cancels the common mode noise which surrounds it.

The broadband low frequency passive receiving antenna system of the present disclosure may be comprised of the following elements. This list of possible constituent elements is intended to be exemplary only and it is not intended that this list be used to limit the broadband low frequency passive receiving antenna system of the present application to just these elements. Persons having ordinary skill in the art relevant to the present disclosure may understand there to be equivalent elements that may be substituted within the present disclosure without changing the essential function or operation of the broadband low frequency passive receiving antenna system.

1. Obtain any wire, whip, or telescopic rod, typically about nine-thirty feet long and connect to the transformer.

2. Use a transformer with approximately 150 mH inductance on the primary and seventy turns on the secondary.

3. Connect lower wires of transformer primary and secondary to lower wire of a 0.0039 uF capacitor. In addition, connect this to the braid of a thirty foot 50-Ohm coax cable. Connect top wire of secondary to the top wire of the capacitor and to the center conductor of the thirty foot coax.

4. At the end of the thirty foot coax connect a differential choke (transformer) to the coax with a 1:1 turns ratio and inductance of 1.7 mH. Connect the secondary to a receiver 50-Ohm input.

The various elements of the broadband low frequency passive receiving antenna system of the present disclosure may be related in the following exemplary fashion. It is not intended to limit the scope or nature of the relationships between the various elements and the following examples are presented as illustrative examples only. The short nine-thirty foot antenna whip or wire is impedance resonated at a low frequency of approximately fifty kilohertz (50 Khz) but the secondary winding over-couples the primary causing it to have a flat response rather a peak response (resonance.) The response is mostly flat from 40-500 Khz but has a low output of −23 dBc due to the over-coupling. The capacitor resonants the leakage inductance at the upper range (300-500 kHz) raising the response six decibels (6 dB). This makes the antenna have a flat response of +/−1 dB from 50-500 kHz. With a −10 dBm input the output is-37 dBm (27 dB loss). This is a moderate loss but typical of a loop antenna and easily increased with a preamplifier.

The broadband low frequency passive receiving antenna system of the present disclosure generally works by receiving both noise and signal yet provides a higher signal to noise ratio by use of the differential transformer input that cancels noise. It is immune to overload because it has no active components and requires no power and has no direct coupling to the receiver which further lowers noise reception.

To make the broadband low frequency passive receiving antenna system of the present disclosure, the individual components can be soldered directly and contained in a weather-proof housing. A thirty foot coax is used to connect the electronics to a transformer which is also housed in a weather-tight enclosure. A coax cable (or similar) is used at this point to connect to the receiver.

By way of example, FIG. 1 conceptually illustrates a front view of an exemplary installation of a broadband low frequency passive receiving antenna system in some embodiments. As shown in this figure, the broadband low frequency passive receiving antenna system comprises a vertical antenna 10, a matching unit 12, an antenna transmission line 14, a coupling transformer 16, and a destination transmission line 18 connected to a communications receiver (not shown in this figure), such as a radio.

Now turning to another view, FIG. 2 conceptually illustrates a flow chart 200 of operations and relationships of the components of the broadband low frequency passive receiving antenna system in some embodiments. As shown in this figure, the flow chart 200 involves several steps 202-208. In the first step (at 202), the receiving antenna is assembled by connecting the whip antenna 10 and the transmission line 14 out of phase to the matching unit 12. Note that the whip antenna 10 connected to the matching unit may be a vertical whip antenna or, alternately, a wire antenna. Typical installations would include assembly of an antenna that is approximately nine-thirty feet in length. In some practical installations, a whip or wire antenna of approximately seventeen feet is used along with a thirty-five foot mast.

Turning to the component relationships described in the next step (at 204), the matching unit 12 incorporates a broadband transformer. The input to this broadband transformer is differential, thereby allowing a radio wave to induce a differential current while reducing or eliminating noise signals that are not differential in nature (at 204).

During the next step (at 206), another end (the "secondary end") of the transformer incorporated into the matching unit 12 is connected to the transmission line 14, which is typically a coaxial transmission line, and which acts as both antenna and feedline.

The final step (at 208) demonstrates that the transmission line 14 is terminated into the primary coil of the coupling transformer 16, which isolates the balanced whip antenna 10 and the transmission line 14, while the secondary coil of the coupling transformer 16 connects to a shielded coaxial cable 18 of any length. The shielded coaxial cable 18 extends to the communications receiver, or radio. For best performance, the shielded receiver coaxial cable 18 would be less than ¼ wavelength at the highest frequency of operation.

Thus, noise and signals received by both the antenna 10 and transmission line 14 are in phase and common are canceled out by the coupling transformer 16, while signals which are not in phase are transformed to a lower impedance and sent down the transmission line 18 to the radio receiver.

In this way, it is possible to understand how the broadband low frequency passive receiving antenna system works. These steps of the flow chart 200 are conceptual and demonstrate conceptual relationships between the various components. However, the order and flow of steps may not necessarily follow the order as illustrated here, and the various relationships between the components are demonstrated as exemplary only, and do not necessarily indicate the exact assembly and relationship of the components in the views shown in FIG. 1, since the broadband low frequency passive receiving antenna system shown in FIG. 1 only demonstrates one example of an installation/deployment of the broadband low frequency passive receiving antenna system. For instance, it is possible to deploy the broadband low frequency passive receiving antenna system at a location in which there is no nearby building structure, but only natural structures, such as trees or other natural surfaces and structures. Therefore, a more generalized view of the broadband low frequency passive receiving antenna system is described next, by reference to FIG. 3.

Figure 3:
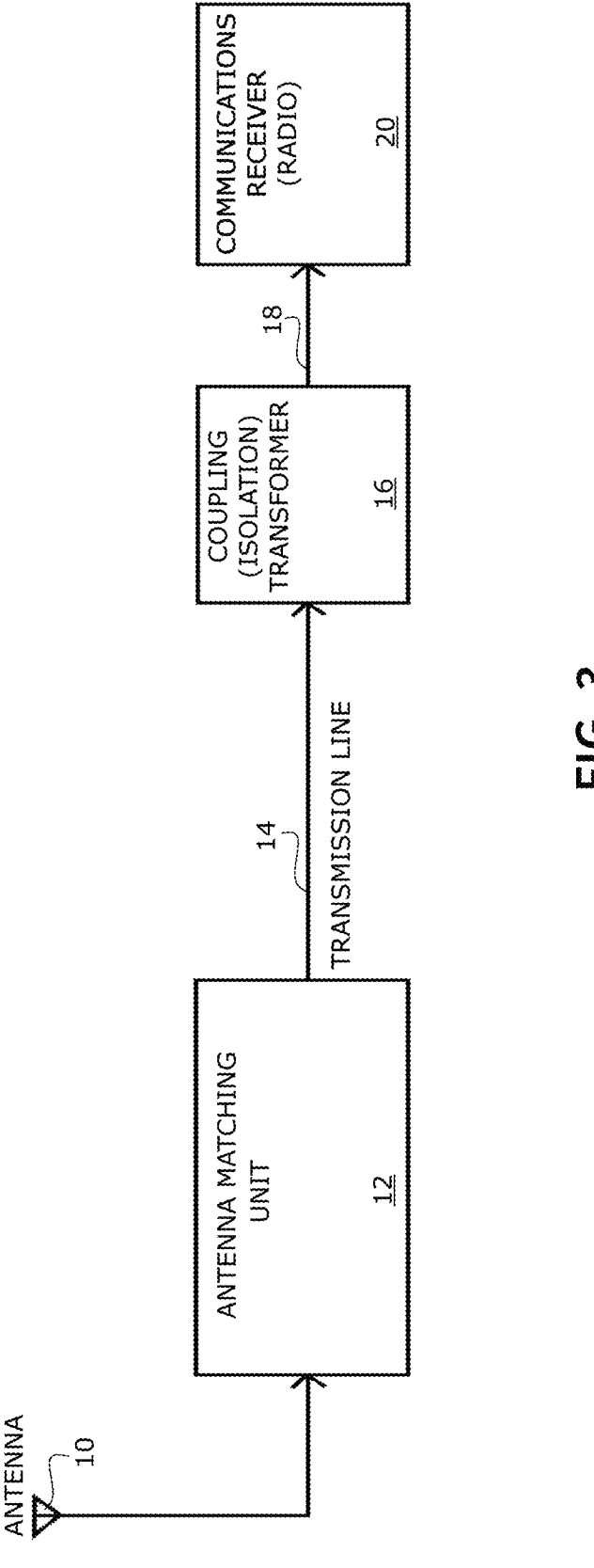
FIG. 3 conceptually illustrates a block diagram of the individual components of the broadband low frequency passive receiving antenna system in some embodiments.

Specifically, FIG. 3 conceptually illustrates a block diagram of the individual components of the broadband low frequency passive receiving antenna system in some embodiments. As shown in this figure, the individual components of the broadband low frequency passive receiving antenna system include the antenna 10, the antenna matching unit 12, the transmission line 14, the coupling transformer 16, and the destination transmission line 18. Unlike the view shown in FIG. 1, however, this figure also shows a communications receiver 20. The communications receiver 20 typically is a radio.

To use the broadband low frequency passive receiving antenna system of the present disclosure, a user would install the antenna outdoors and on the roof using a five-ten foot ("5-10 foot") non-conductive mast such as fiberglass, or a mast away from power lines with the thirty foot ("30 foot") connection coax placed in a direction away from antenna. The antenna should be vertical and thirty foot coax also as vertical as possible. This may then elevate to a full thirty-five foot mast/antenna.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A broadband low frequency passive receiving antenna system that is an omnidirectional receiving antenna configured to provide broadband reception of the low frequency (LF) portion of the radio frequency (RF) spectrum, said broadband low frequency passive receiving antenna system comprising:

an antenna that receives noise and radio wave signals;

an antenna transmission line, wherein the antenna transmission line comprises a coaxial transmission line that acts as both a receiving antenna that receives noise and radio wave signals and a feedline;

a matching unit to which the antenna and the antenna transmission line connect out of phase, wherein the matching unit incorporates a broadband transformer with a first end and a second end, wherein input to the first end of the broadband transformer is differential to allow a radio wave to induce a differential current, wherein the antenna transmission line connects to the second end of the broadband transformer incorporated into the matching unit;

a coupling transformer comprising a primary coil and a secondary coil, wherein the antenna transmission line is terminated into the primary coil which isolates the antenna and the antenna transmission line, wherein the coupling transformer cancels out common noise and signals received by the antenna and the antenna transmission line, wherein the coupling transformer transforms signals that are not in phase to a lower impedance; and a radio transmission line attached to the secondary coil of the coupling transformer and connected to a radio, wherein the lower impedance signals transformed by the coupling transformer are transmitted to the radio through the radio transmission line.

2. The broadband low frequency passive receiving antenna system of claim 1, wherein the coupling transformer, the transmission line, and the matching unit work together to provide reception of radio signals in the 10 kHz-800 kHz range.

3. The broadband low frequency passive receiving antenna system of claim 2, wherein the radio signals in the 10 kHz-800 kHz range are transmitted to the radio over the radio transmission line.

4. The broadband low frequency passive receiving antenna system of claim 1, wherein the antenna comprises a vertical antenna.

5. The broadband low frequency passive receiving antenna system of claim 4, wherein the vertical antenna comprises a short user-defined vertical antenna.

6. The broadband low frequency passive receiving antenna system of claim 4, wherein the vertical antenna comprises a citizens band (CB) whip antenna.

7. The broadband low frequency passive receiving antenna system of claim 4, wherein the vertical antenna comprises a telescopic mast antenna.

8. The broadband low frequency passive receiving antenna system of claim 1, wherein the antenna comprises a wire antenna.

9. The broadband low frequency passive receiving antenna system of claim 1 further comprising a mast.

10. The broadband low frequency passive receiving antenna system of claim 1, wherein the radio transmission line comprises a 50-Ohm coaxial cable.

* * * * *